United States Patent
Lyngso et al.

(10) Patent No.: US 6,279,721 B1
(45) Date of Patent: Aug. 28, 2001

(54) CONVEYOR SYSTEM FOR CONVEYING ARTICLES OF DIFFERENT TYPES

(75) Inventors: Henrik Lyngso, Aarhus C; Ole Vitting Pedersen, Hasselager, both of (DK)

(73) Assignee: Crisplant A/S, Arhus N (DK)

( * ) Notice: Subject to any disclaimer, the term of this patent is extended or adjusted under 35 U.S.C. 154(b) by 0 days.

(21) Appl. No.: 09/211,007

(22) Filed: Dec. 15, 1998

(30) Foreign Application Priority Data

Dec. 23, 1997 (DK) .......................................... 01533

(51) Int. Cl.$^7$ .................................................. B65G 37/00
(52) U.S. Cl. ...................................... 198/369.2; 198/465.1
(58) Field of Search ............................... 198/369.2, 465.1

(56) References Cited

U.S. PATENT DOCUMENTS

| | | |
|---|---|---|
| 3,642,158 | 2/1972 | Koennecke et al. . |
| 3,776,395 | 12/1973 | Lingg et al. . |
| 4,411,354 * | 10/1983 | Thibault et al. .................... 198/472 |
| 4,739,607 * | 4/1988 | Annas, Sr. et al. .................... 53/557 |
| 5,301,790 | 4/1994 | Prydtz et al. . |
| 5,409,097 | 4/1995 | Hoegger . |
| 5,640,833 * | 6/1997 | Gerber .................................. 53/443 |
| 5,671,837 * | 9/1997 | Tazou et al. ...................... 198/369.2 |
| 5,692,593 * | 12/1997 | Ueno et al. ....................... 198/369.2 |
| 5,909,796 * | 6/1999 | Soldavini ......................... 198/369.2 |
| 5,934,444 * | 8/1999 | Kierpaul et al. .................... 198/580 |

FOREIGN PATENT DOCUMENTS

| | | |
|---|---|---|
| 2347820 | 9/1973 | (DE) . |
| 2821815 | 11/1979 | (DE) . |
| 3317087 | 11/1984 | (DE) . |
| 0227254 | 7/1987 | (EP) . |
| 0456297 | 11/1991 | (EP) . |
| 556037A1 | 8/1993 | (EP) . |
| 556037B1 | 8/1993 | (EP) . |
| 0569788 | 11/1993 | (EP) . |
| 0787668 | 8/1997 | (EP) . |
| 1415606 | 9/1973 | (GB) . |

* cited by examiner

*Primary Examiner*—H. Grant Skaggs
*Assistant Examiner*—Rashmi Sharma
(74) *Attorney, Agent, or Firm*—Birch, Stewart, Kolasch & Birch, LLP (57) ABSTRACT

Baggage handling conveyor system for conveying articles needed to be supported by trays as well as articles not needed such support, comprising a delivery platform for receiving articles, a storage device for storing trays and a conveyor for selectively and automatically moving a tray from the storage device to the delivery platform. The conveyor is movable between a position establishing a conveying connection between the storage device and the delivery platform, and a position disrupting the connection. Articles may be moved from the delivery platform to a predetermined destination. The system reduces the risk of, e.g., back injuries to the staff. The system is well suited for airport check-in counters.

25 Claims, 8 Drawing Sheets

CONVEYOR SYSTEM FOR CONVEYING ARTICLES OF DIFFERENT TYPES

TECHNICAL FIELD

The present invention relates to a conveyor system for conveying articles of different types. A conveyor system according to the present invention is in particular useful in a check-in area for checking in articles such as luggage or baggage at airports or other locations where article check-in is performed such as, e.g., railway stations or ship departure halls. However, a conveyor system according to the present invention may be applied for any appropriate purpose at any appropriate location, such as in production lines and/or distribution/collecting lines at, e.g., factories or mail terminals. The articles to be conveyed may be of a kind which needs to be supported by a separate supporting member, such as, e.g., a tray or of a kind which needs no support by a supporting member. An article which needs to be supported by a supporting member may, e.g., be an irregular or fragile article.

The invention further relates to a conveyor plant comprising one or more conveyor systems according to the invention.

BACKGROUND ART

It is well known to employ a tray when transporting irregular or fragile pieces of luggage or goods from a check-in counter at, e.g., an airport, to a predetermined destination, such as a certain departure gate, using a conveyor system.

Thus, in many airport check-in areas a tray is used when an irregular or fragile piece of luggage is brought to the check-in counter. The trays are carried manually from a storage area to the check-in counter by an operator operating the check-in counter.

In other known systems, trays or carts are used for conveying every single piece of luggage brought to a check-in counter, including the ones not necessarily needing support from a tray or a cart. Systems of this kind are disclosed in European patent applications Nos. EP 0 456 297 A2 and EP 0 556 037 A1.

European patent application No. EP 0 456 297 A2 discloses an endless conveyor for conveying trays carrying pieces of luggage. The system further comprises a supply conveyor and two discharge conveyors. The supply conveyor feeds the trays carrying the pieces of luggage onto the endless conveyor, and the two discharge conveyors move the luggage and the empty trays, respectively, away from the endless conveyor.

European patent application No. 0 556 037 A1 discloses a baggage handling system for use at an aircraft passenger check-in position. The system comprises lift means for lifting empty baggage-conveying carts or trays from a position below the check-in area to the check-in counter. The luggage is placed in a cart and is checked in. The cart carrying the luggage is then lowered by the lift means, and is thereby moved to a conveyor system positioned below the level of the check-in area.

DESCRIPTION OF THE INVENTION

An object of the present invention is to provide a conveyor system which, while retaining the flexibility of the manual system, is capable of providing a supporting member to, e.g., a luggage delivery platform at a luggage check-in counter in a way that is less troublesome for the person operating the check-in counter than in a system in which supporting members are provided manually, thus eliminating or at least reducing the risk of causing lingering diseases to the operator due to overload of, e.g., the operator's back. In addition, it is desirable to provide a conveyor system which makes it possible to obtain a rational and fast handling of both the supporting members and the articles not needing to be supported by supporting members.

The present invention provides a conveyor system for conveying articles of different types including articles which need to be supported by separate supporting members when being transported by the conveyor system, the conveyor system comprising a delivery platform for receiving an article to be transported, storing means for storing a supply of supporting members, and conveyor means for selectively moving a supporting member from the storing means to the delivery platform when actuated by an operator or an operating means.

The articles which need to be supported may be, e.g., soft or irregular pieces of luggage or baggage, such as, e.g., backpacks, or fragile goods. The supporting members are preferably trays, but may also be other kinds, such as, e.g., boxes, containers etc. They may preferably be made from a rigid and hard-wearing material, such as, e.g., a plastics material or any suitable metal including aluminium and steel and their alloys. For most applications, the supporting members preferably have an open top and a substantially plane bottom surface. Trays having relatively high side walls may be used as supporting members.

Articles to be transported are received at the delivery platform. The delivery platform may be, e.g., a weighing conveyor for weighing articles. The storing means is used for storing a supply of supporting members. The storing means may comprise actual storage space located at a distant location, such as, e.g., at a central tray storage at an airport. It may further comprise tray conveyors used both for storing the supporting members and for conveying them from a distant storage space to a given location. These tray conveyors may ensure that there is always a tray available near the delivery platform when needed. The conveyor means for selectively conveying a supporting member from the storing means to the delivery platform is adapted for conveying a supporting member from the part of the storing means positioned near the delivery platform to the delivery platform when actuated by a human operator or by an operating means. Thus, the operator or the operating means may select or determine whether a tray is to be provided for transporting the article brought to the delivery platform.

The tray conveyor may comprise a rack and/or other stacking means for stacking trays at a location near the delivery platform.

Where in the present context, the term "tray" is used, this should be understood as any appropriate supporting member including the above-mentioned types of supporting members.

The conveyor means mentioned above for transporting the supporting members from the tray conveyor to the delivery platform is preferably belt conveyors, but could also be other kinds of conveyors, such as, e.g., double belt conveyors, roller paths or gravity conveyors including skids or chutes. The tray conveyor is preferably a double belt conveyor having a pair of transversely spaced belts for supporting and driving an article and/or a supporting member. The tray conveyor may, however, be another kind of conveyor, such as, e.g., a belt conveyor, a roller path or a gravity conveyor.

Thus, the invention provides a system for automatically providing selectively a supporting member when a supporting member is needed/desired, as determined by an operator or an operating means. Thereby, the system according to the invention is effective in the sense that through this selective operation, only a relatively small number of supporting members is needed and in the sense that the size of articles to be conveyed is not limited by the size of the supporting members.

Thus, the conveyor system according to the present invention, being capable of both selectively and automatically providing supporting members, is flexible, time saving and ergonomic as it to a maximum degree prevents the operator from being subjected to physical stress.

In the present context, the term "operating means" should be interpreted as any equipment capable of actuating the conveyor system so as to cause a supporting member to be moved from the storing means to the delivery platform as a response to a demand determined by the operating means or equipment co-operating with the operating means. Thus, the operating means may comprise or co-operate with sensing means, such as one or more optical sensors, cameras, weighing devices or other appropriate sensing means which create an output signal indicating the demand for an action. The sensing means may be incorporated in or electronically connected to the operating means, so that its output signal may be passed to the operating means.

Alternatively, a sensing means may comprise means, such as, e.g., a monitor, for delivering a signal, e.g. an auditory signal or an optical signal, perceivable by a human operator, the human operator then actuating the conveyor system so as to cause the movement of a supporting member from the storing means to the delivery platform.

It is also possible to combine operation by a human operator and operation by an operating means; in this case, the operating means is preferably adapted to actuate the conveyor system so as to cause the movement of a supporting member from the storing means to the delivery platform in response to preselected signal patterns or conditions from its sensing means, and the human operator can then, if desired, overrule the actuating by the operating means and/or herself or himself decide whether or not actuation should be performed in cases where the operating means has not determined the need for actuation.

The storing means, in particular the part positioned near the delivery platform, and the delivery platform may be positioned at different levels. This may contribute to a better and more efficient utilisation of the three-dimensional space available.

Preferably, the storing means is positioned at a lower level than the delivery platform. When the opposite is the case empty supporting members may gain too much velocity when being transported from the storing means to the delivery platform, causing them to pass the delivery platform and maybe injure a passenger or a member of the staff.

It is further preferred that the supporting members carrying articles and the articles not being supported by a supporting member should be elevated a minimal distance, most preferably they should not be elevated at all. It is thus preferred that the delivery platform and the main conveyor are positioned at substantially the same level.

The conveyor system preferably comprises a conveyor arrangement for transporting articles placed on the delivery platform to a predetermined destination. This conveyor arrangement is suitably capable of transporting both articles not needing to be supported by a supporting member and supporting members carrying articles needing such a support.

The conveyors comprised in the conveyor arrangement are preferably belt conveyors, but they may also be other kinds of conveyors, such as, e.g., double belt conveyors, roller paths or gravity conveyors. Articles not needing to be supported by supporting members may be, e.g., suitcases having relatively stiff surface walls or cardboard boxes. The predetermined destination may be, e.g., a departure gate at an airport.

In a preferred embodiment, the conveyor system according to the present invention may comprise a first conveyor section being movable between a first position and a second position. In the first position, a conveyor connection between the storing means, in particular the part being positioned near the delivery platform, and the delivery platform is established. In the second position, the conveyor connection is disrupted. When the conveyor means for selectively moving a supporting member from the storing means to the delivery platform is actuated by the operator or the operating means, the movable conveyor section will move into its first position. Thus, the conveyor connection between the storing means and the delivery platform is established, allowing a supporting member to be moved to the delivery platform from the storing means. When the movable conveyor section is in its second position, it may form part of the conveyor arrangement transporting articles from the delivery platform to the predetermined destination.

The movement of the movable conveyor section is preferably pivotal, most preferably pivotal around a pivot axis positioned at one of its ends. However, it may alternatively or additionally comprise a linear or any other movement. In the case that the movable conveyor section is pivotally movable, the conveyor system according to the invention may further comprise means for pivotally moving the movable conveyor section between the first and second positions. The means for moving the movable conveyor section may comprise hydraulic, pneumatic, electrical or any other suitable activators, including a crank handle.

The conveyor arrangement for transporting the articles from the delivery platform to the predetermined destination may further comprise at least one second conveyor section interconnecting the delivery platform and the movable conveyor section in its second position so as to provide a distance between the delivery platform and the conveyor section if so required or needed.

The conveyor arrangement for conveying articles from the delivery platform to the predetermined destination may comprise a main article conveyor and one or more connecting conveyor sections. The main article conveyor is adapted for conveying articles to the predetermined destination. The one or more connecting conveyor sections preferably interconnects the first movable conveyor section and the main article conveyor when the first movable conveyor section is in its second position.

If the movable conveyor section forms part of the conveyor arrangement transporting the articles from the delivery platform to the predetermined destination when the movable conveyor section is in its second position, the conveyor system may further comprise means for reversing the direction of movement of at least the movable conveyor section. Thus the movable conveyor section is capable of moving an empty supporting member from the storing means to the delivery platform when the first conveyor section is in its first position. The movable conveyor section is further capable of moving an article or a supporting member carrying an article from the delivery platform to the conveyor arrangement when the movable conveyor section is in its second position. This last mentioned movement is carried out in a reverse direction as compared to the direction of movement of the empty supporting member, when the movable conveyor section is in its first position.

In case at least one conveyor section is interconnecting the delivery platform and the movable conveyor section in its second position, the conveyor system also comprises means for reversing the direction of movement of such conveyor section(s), so that an empty supporting member may be moved from the storing means to the delivery platform, and so that articles may be moved from the delivery platform to the conveyor arrangement as described above.

The conveyor arrangement may further comprise a third conveyor section constituting another movable conveyor section arranged above the first movable conveyor section. In this case both of the conveyor sections are pivotally movable between a first and a second position. In the first position the storing means is interconnected with the delivery platform by the first movable conveyor section, while the conveyor arrangement is disrupted by the other movable conveyor section. In the second position the connection between the storing means and the delivery platform is disrupted by the first movable conveyor section, while the other movable conveyor section establishes a conveyor connection between the delivery platform and the conveyor arrangement transporting the articles from the delivery platform to the predetermined destination. In this embodiment of a conveyor system according to the present invention, the first movable conveyor section preferably does not form a part of the conveyor arrangement transporting the articles from the delivery platform to the predetermined destination.

As mentioned above, the storing means may comprise a tray conveyor. It may further comprise transferring means for transferring a supporting member positioned at a predetermined position on the tray conveyor to the first movable conveyor section. The transferring means may perform the step of moving a supporting member from the tray conveyor to a conveyor connecting the tray conveyor and the first movable conveyor section, e.g. by pushing or pulling, in which case the transferring means comprises pushing or pulling means, or by conveyor means.

In case the transferring means comprises pushing means, the pushing means may, e.g., comprise a pushing plate rigidly connected to one or more actuators, such as, e.g., hydraulic, pneumatic or electrical activators.

Preferably, the transferring means comprises conveyor means, and means for moving the conveyor means between a position in which the conveyor means may engage with a supporting member, and a position in which it does not engage with a supporting member. Preferably, the conveyor means is arranged beneath the tray conveyor when in its non-engaging position, and above the tray conveyor when in its engaging position. When a supporting member is needed at the delivery platform, the conveyor means will be moved from its non-engaging position to its engaging position. It is then activated so as to move the supporting member with which it engages to the connecting conveyor.

The conveyor means described above may be, e.g., a belt conveyor and/or rollers and/or one or more wheels and/or any other suitable conveyor means.

The movement of the supporting member may be performed in a direction which is substantially transversal to the tray conveyor so as to allow a succeeding supporting member to be moved into the predetermined position along the tray conveyor. This ensures that there is always a supporting member available whenever the conveyor means for selectively moving a supporting member from the storing means to the delivery platform is actuated by the operator. In case the transferring means comprises conveyor means, the movement is preferably further slightly inclined in an upward direction.

The conveyor system according to the present invention may further comprise a return conveyor for returning supporting members from the predetermined destination to the tray conveyor or to the part of the storing means positioned at a distance from the check-in area. The supporting members may be positioned manually or automatically on the return conveyor after having been emptied at the predetermined destination. This recirculation of the supporting members provides a continuous supply of supporting members to the tray conveyor, ensuring that there is always a supporting member available, whenever it is needed at the delivery platform.

The return conveyor may additionally supply empty supporting members to other locations, such as a location where transfer luggage from, e.g., aeroplanes is entered into the conveyor system.

The conveyor means of a conveyor system according to the present invention preferably comprises one or more belt conveyor sections, but it may additionally or alternatively comprise any other kind of conveyors such as, e.g., roller paths, chain conveyors or gravity conveyors.

A conveyor system according to the present invention may further comprise actuator means for activating the pivoting movement of the first and/or third conveyor section. The actuator means may be, e.g., hydraulic, pneumatic or electrical. The conveyor system may further comprise a control unit electronically interconnected to the actuator means and to operating means operable by the operator. The operating means may comprise one or more separate buttons, handles, keyboards, voice recognition systems, touch screens and/or other appropriate means. The control unit may further be an integrated part of a data system. In this case the actuator means may be integrated in a computer or in the data system. The data system may additionally be adapted for controlling the flow of articles, checking identity of luggage and/or persons, e.g., airline passengers, and it may further be connected to a data network connected to other data systems for receiving and/or distributing information, such as, e.g., identity data, flight schedules and/or any other kind of information.

The present invention further relates to a conveyor plant comprising one or more conveyor systems according to the invention. The conveyor plant is preferably located in a place where articles are delivered, such as, e.g., check-in counters for goods or luggage at, e.g., an airport, a railway station or a ship departure hall, but it may also be located in other places where conveyor systems are employed, such as, e.g., processing plants, mail terminals etc.

The conveyor plant may comprise at least two conveyor systems according to the invention. At least the main article conveyors of at least two neighbouring conveyor systems are interconnected so that articles may be conveyed from one conveyor system to another. Preferably, the tray conveyors are also interconnected so as to allow trays or supporting members to be conveyed from one conveyor system to another. Preferably, the conveyor systems are arranged so that articles may be conveyed to a predetermined destination by the conveyor means of the conveyor systems or by one or more external conveyors connected to one or more of the conveyor systems comprised in the conveyor plant. The external conveyor(s) may comprise one or more conveyors for continuously conveying articles. The external conveyor(s) may alternatively/additionally comprise one or more conveyors, such as, e.g., carts, to which articles are manually or automatically transferred.

The conveyor plant may further comprise an arrangement for discharging articles carried by the supporting members at or near the predetermined destination and/or at other locations. The conveyor plant may further comprise means for manually or automatically loading emptied supporting members to a supporting member conveyor which is preferably connected to one or more tray conveyors of the one or more conveyor systems comprised in the conveyor plant so as to return the supporting members to an area near the delivery platform.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The present invention will become more fully understood from the detailed description given hereinbelow and the accompanying drawings which are given by way of illustration only, and thus are not limitative of the present invention, and wherein:

DETAILED DESCRIPTION OF THE DRAWINGS

FIGS. 1–8 show various embodiments of a conveyor system according to the present invention comprised in a check-in area at, e.g., an airport, a railway station, a ship departure hall or another suitable location.

The conveyor system comprises a check-in counter 10, a terminal 11 for passenger check and/or for registration of luggage, a delivery platform 12 comprising a weighing conveyor for receiving and weighing luggage. The check-in area further comprises movable conveyor sections 13, 16, 17, 22 and connecting conveyor sections 14, 18 adapted for transporting luggage from the delivery platform 12 to a main article conveyor 15 along which luggage is conveyed to a predetermined destination, such as, e.g., a departure gate at an airport.

The movable conveyor sections 13, 22 are further adapted for conveying trays 24 from connecting conveyor sections 20, 21, 23, or directly from a main tray conveyor 19, to the delivery platform 12. The connecting conveyor sections 20, 21, 23 may be used both for conveying and for storing trays 24. Empty trays are provided from a main tray conveyor 19 along which trays are conveyed from a main tray store (not shown).

Transferring means 25 is provided for displacing trays being conveyed or stored on the main tray conveyor 19 onto the connecting conveyor sections 20, 21, 23. The transferring means 25 comprises two hydraulic, pneumatic or electrical activators 26 each connected at one end to a pushing plate or rod 27. By displacing parts of the activators 26 and thereby pushing the plate 27 in a direction which is transverse to the transportation direction of the main tray conveyor 19, a tray 24 which is positioned in front of the plate 27 may be transferred to the connecting conveyor sections 20, 21, 23. Wheels or rollers 28 are comprised between the belts of the conveyor 19 so as to support the trays 24 when being transferred in a direction which is transverse to the conveying direction of the conveyor 19.

In preferred embodiments of the invention, the transferring means 25 further comprises control means electronically connected to the terminal 11. The terminal 11 may be controlled by software causing a tray to be transferred from the main tray conveyor 19 to the connecting conveyor sections 20, 21, 23 each time a tray is being transferred from the sections 20, 21, 23 to the delivery platform 12.

The trays 24 are used for supporting first pieces of luggage 29 which need to be supported by such trays 24 during transportation. The trays 24 may optionally be used for second pieces of luggage 30 which need not be supported by trays.

Operating means capable of actuating the movement of the movable conveyor sections 13, 16, 17, 22 and comprising or co-operating with sensing means such as one or more weighing devices and/or photo detectors may be integrated in the terminal 11; the sensing means may be arranged on or adjacent to the terminal 11 or the delivery platform 12 and/or at other suitable locations. An operator, or the 30 operating means, operating the terminal 11 may selectively cause the movable conveyor sections 13, 16, 17, 22 to move between a first operating position in which they establish a connection between the connecting conveyor sections 20, 21, 23 and the delivery platform 12 and a second position in which they establish a connection between the delivery platform 12 and the connecting conveyor sections 14, 18.

The connecting conveyor sections 14, 18 are preferably tilted at an acute angle in relation to the horizontal plane so as to cause pieces of luggage to tip over when being passed from the conveyor sections 14, 18 to the main conveyor 15 in case the pieces of luggage are not supported by their relatively larger surfaces. Preferably, the conveyor sections 14, 18 are tilted so that their lower ends are positioned at downstream positions of the conveyor 15 while their higher ends are positioned at upstream positions of the conveyor 15.

In a preferred embodiment of the invention, the movable conveyor sections 13, 16, 17, 22 comprise control means electronically connected to the terminal 11, the control means being capable of activating the movement of the movable conveyor sections 13, 16, 17, 22 between their first and second operating positions as well as the conveying movement of the conveyor sections 13, 16, 17, 22. The movement of the movable conveyor sections 13, 16, 17, 22 may be activated by hydraulic, pneumatic, electrical or any other suitable activators (not shown). These activators are preferably controlled by control means electronically connected to the terminal 11.

In the preferred embodiments of the invention shown in FIGS. 1–8, the conveyor sections and conveyors 13, 14, 15, 16, 17, 18, 20, 21, 22 are single belt conveyors while the main tray conveyor 19 is a double belt conveyor. However, other types of conveyors may be used.

Figure 1:
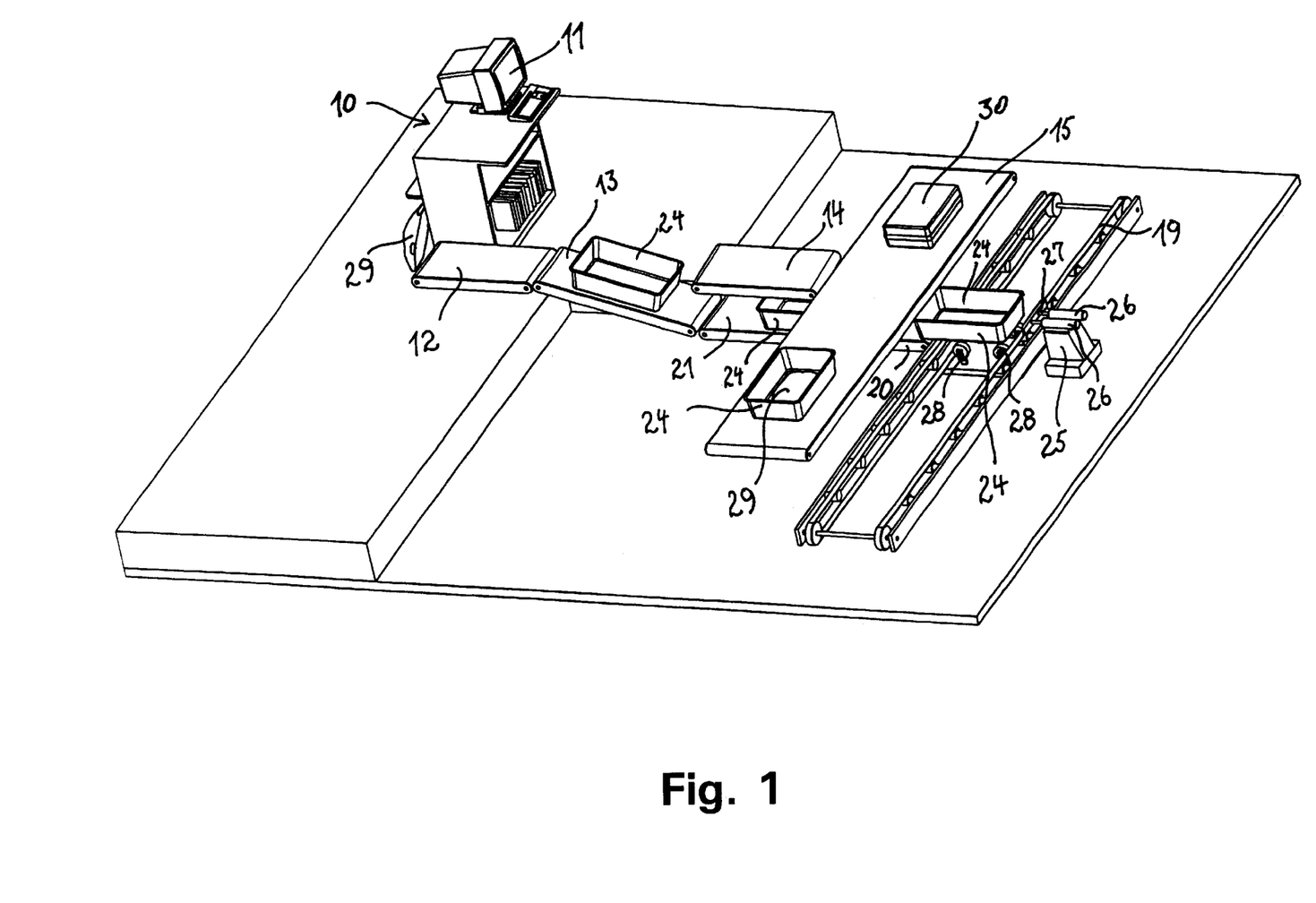
FIG. 1 shows a first embodiment of a conveyor system according to the present invention in a first operating mode.
Figure 2:
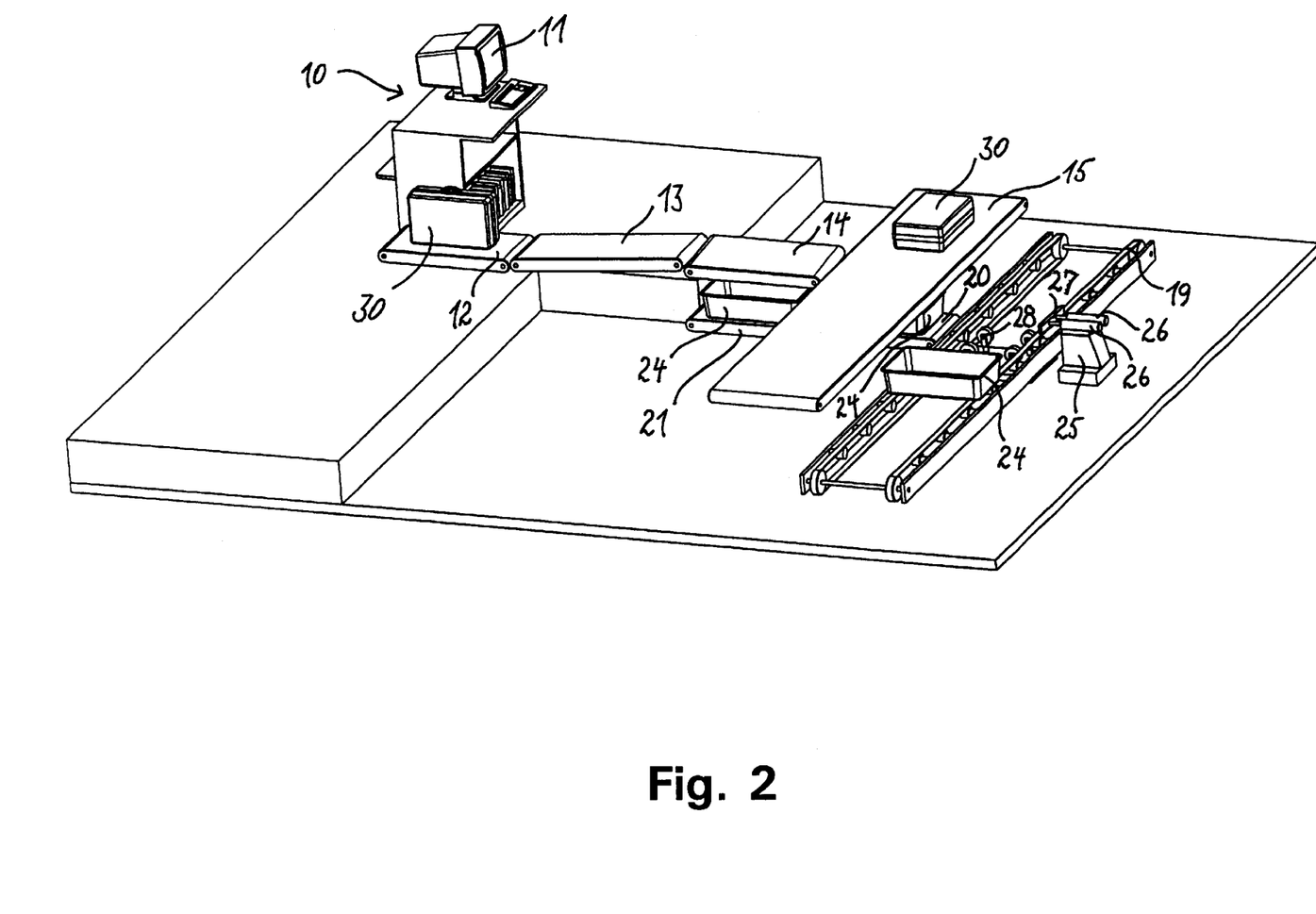
FIG. 2 shows the conveyor system of FIG. 1 in a second operating mode.

FIGS. 1 and 2 show a first embodiment of a conveyor system according to the present invention comprising a movable conveyor section 13 which is movable between a first position shown in FIG. 1 and a second position shown in FIG. 2. In the first position shown in FIG. 1, the conveyor section 13 establishes a conveying connection between the connecting conveyor section 21 and the delivery platform 12. In the second position shown in FIG. 2, the movable conveyor 13 establishes a conveying connection between the delivery platform 12 and the connecting conveyor section 14.

When moving the movable conveyor section 13 into its first position, a conveying movement of the movable conveyor section 13 in a first direction and of the connecting conveyor sections 20, 21 is activated so as to transfer a tray 24 from the connecting conveyor section 21 to the delivery platform 12 while displacing a tray from the conveyor section 20 to the conveyor section 21. Successively, the transferring means 25 may be activated so as to transfer a tray from the main tray conveyor to the connecting conveyor 21.

After moving the movable conveyor section 13 into its second position, a conveying movement of the conveyor section 13 may selectively be activated by the operator, the conveying movement being in a second direction which is opposite to the first direction. The conveying movement of the conveyor section 13 in the second direction will normally be activated when the operator has completed the check-in procedure of the piece of luggage supported by a tray on the delivery platform. Simultaneously or successively the conveying movement of the conveyor section 14 may be activated so as to transfer the piece of luggage from the section 13 to the main conveyor 15.

When the piece of luggage to be checked in does not need to be supported by a tray, the section 13 is moved to or kept in its second position, and the conveying movement of the section 13 is normally activated when the operator has completed the check-in procedure of the piece of luggage. The conveying movement of the section 14 is activated in the same way as described above.

In preferred embodiments of the invention, the conveying movement of the conveyor sections 13 and 14 is stopped when the piece of luggage or the tray conveyed by the sections has passed.

Figure 3:
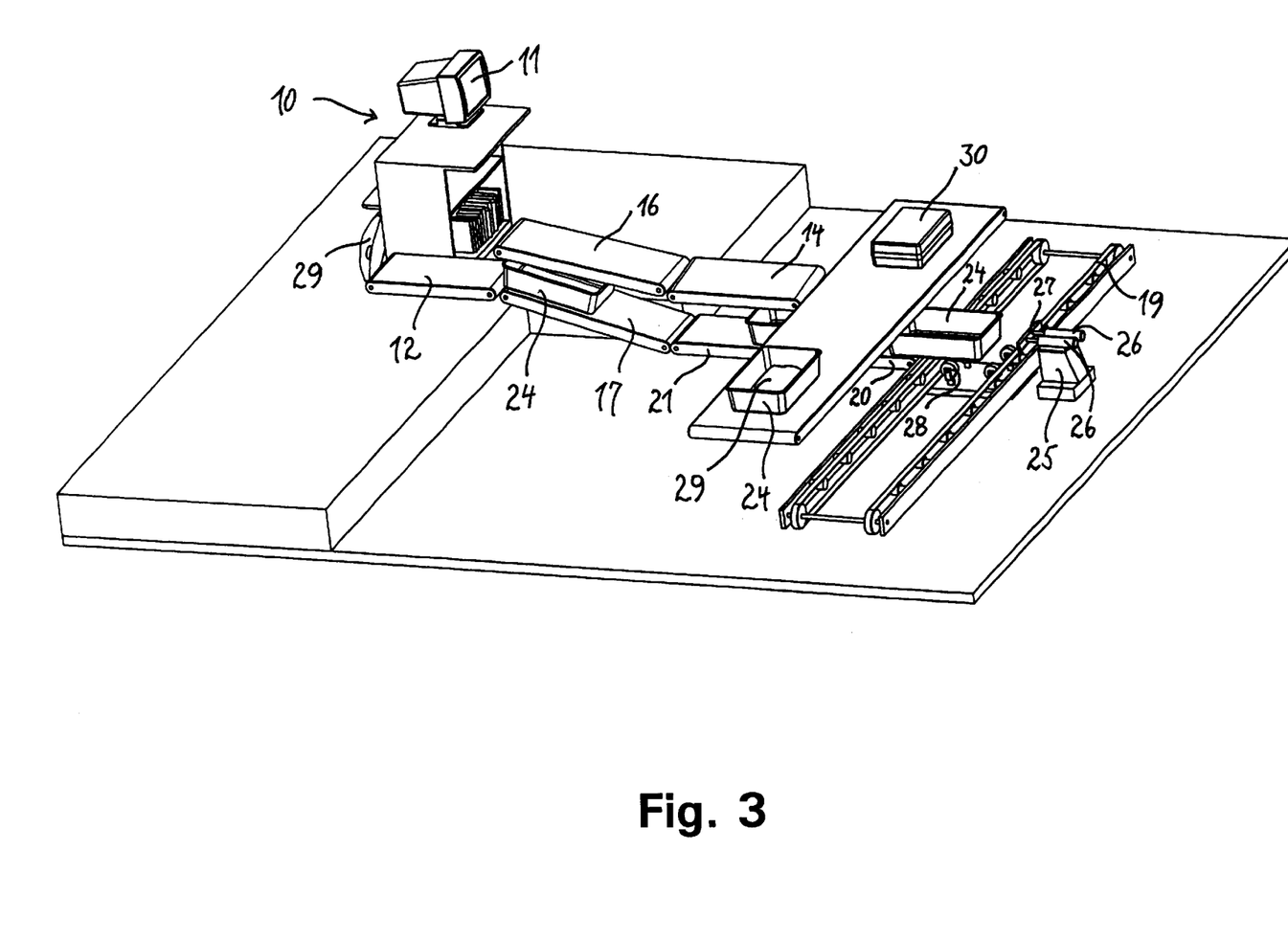
FIG. 3 shows a second embodiment of a conveyor system according the present invention in a first operating mode.
Figure 4:
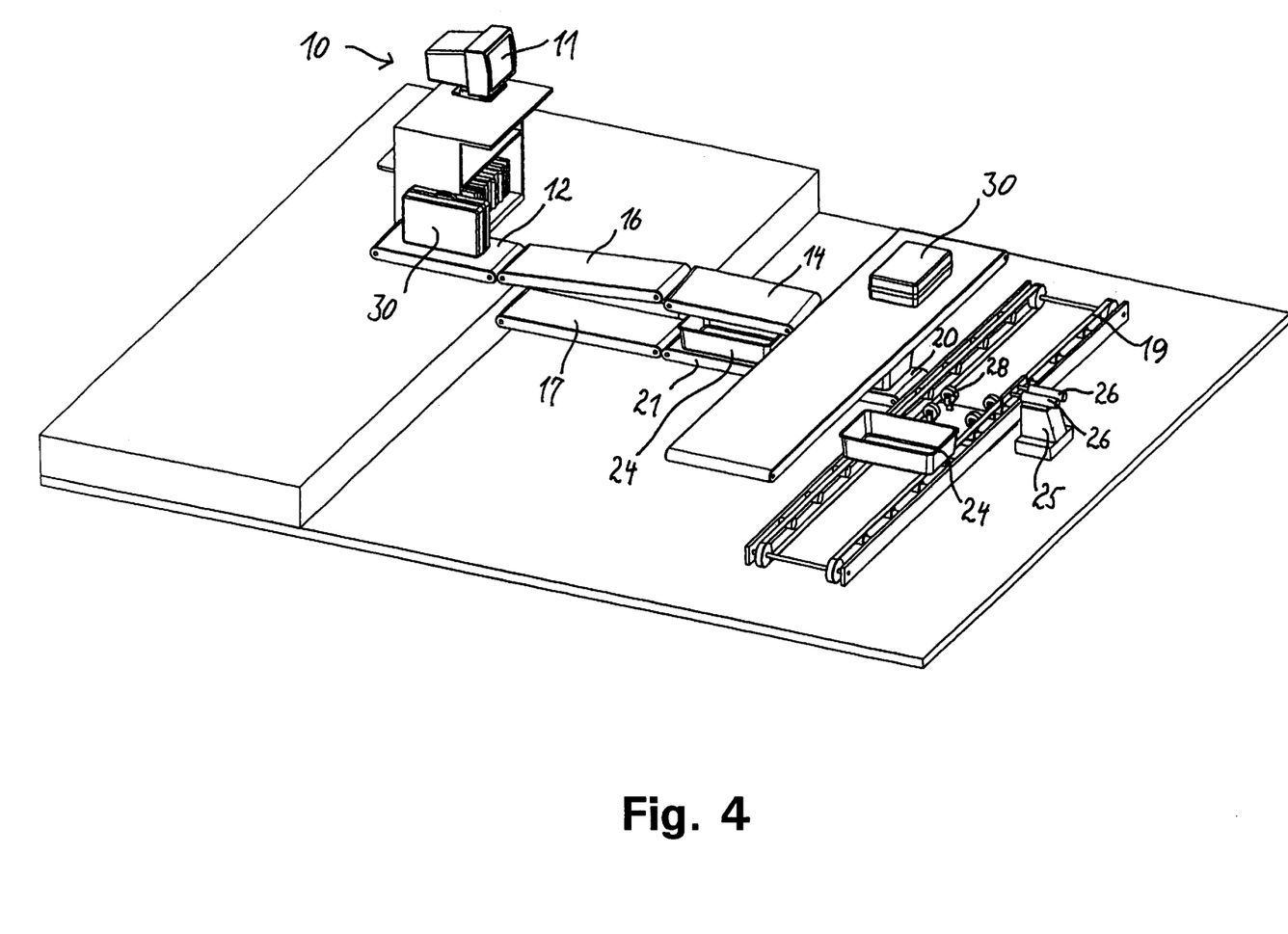
FIG. 4 shows the conveyor system of FIG. 3 in a second operating mode.

FIGS. 3 and 4 show a second embodiment of a conveyor system according to the present invention comprising two movable conveyor sections 16, 17 which are movable between a first position shown in FIG. 3 and a second position shown in FIG. 4. In the first position, the conveyor section 17 establishes a conveying connection between the connecting conveyor section 21 and the delivery platform 12 while the conveyor section 16 is in an idle position. In the second position, the conveyor section 16 establishes a conveying connection between the delivery platform 12 and the conveyor section 14 while the conveyor section 17 is in an idle position. Transferring of trays 24 and moving of the movable sections 16, 17 may be performed in an analogous way as described above in conjunction with the conveyor system of FIGS. 1 and 2.

Figure 5:
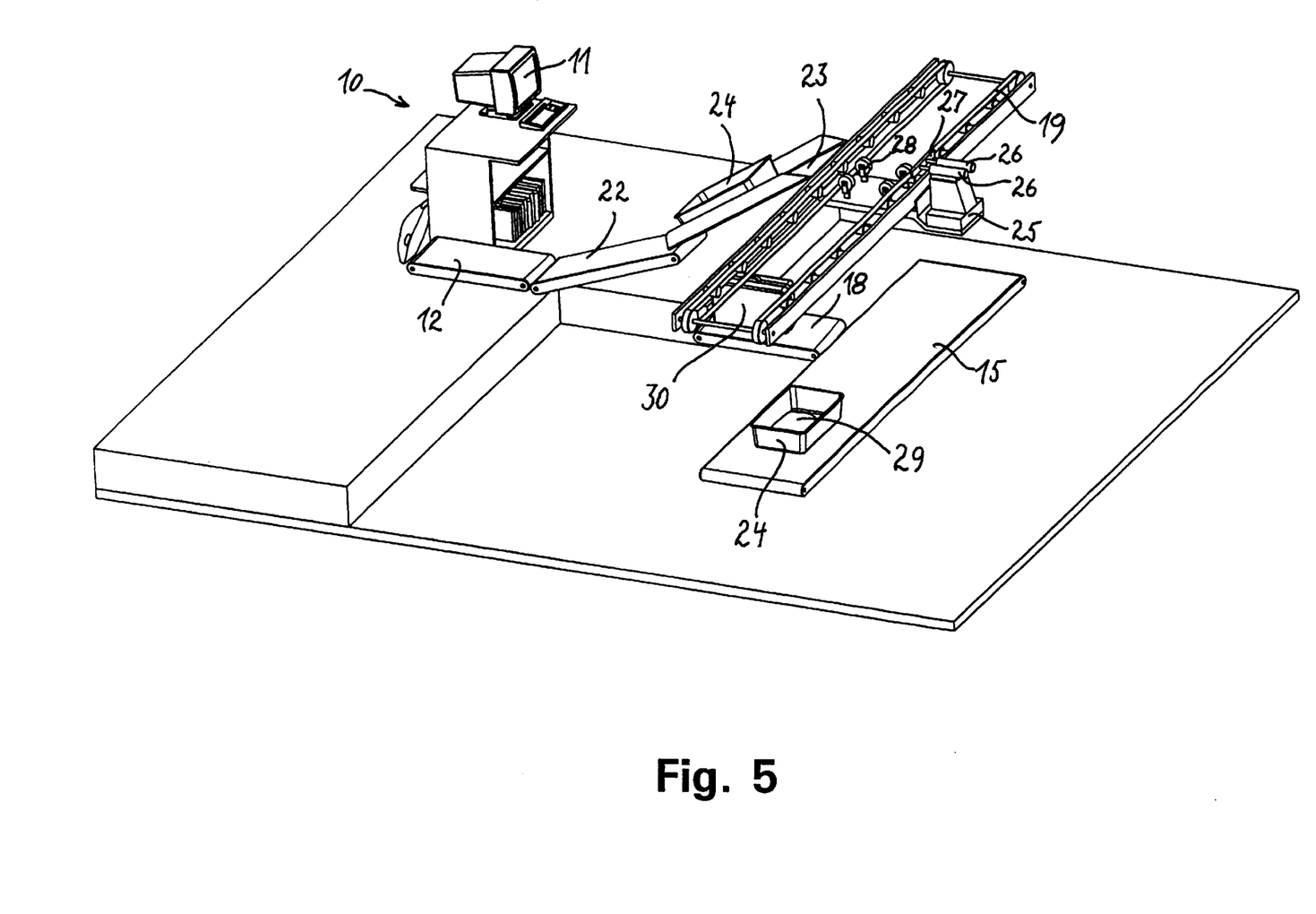
FIG. 5 shows a third embodiment of a conveyor system according the present invention in a first operating mode.
Figure 6:
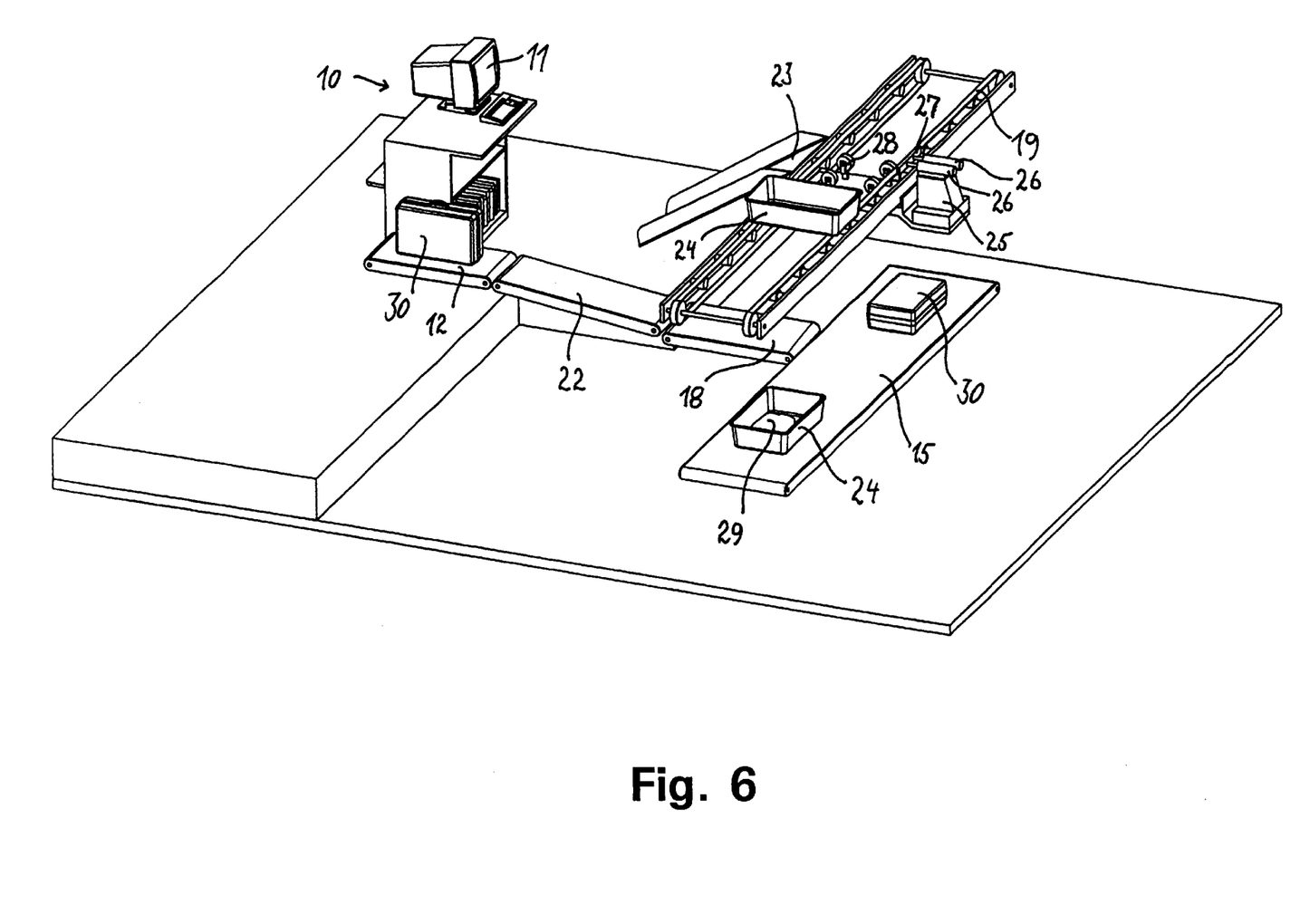
FIG. 6 shows the conveyor system of FIG. 5 in a second operating mode.

FIGS. 5 and 6 show a third embodiment of a conveyor system according to the present invention comprising a movable conveyor section 22 which is movable between a first position shown in FIG. 5 and a second position shown in FIG. 6. In the first position, the conveyor section 22 establishes a conveying connection between the chute 23 and the delivery platform 12. When a tray 24 is wanted at the delivery platform 12, the transferring means 25 is activated, preferably by remote control from the terminal 11, so as to push a tray down the chute 23 along which the tray slides onto the section 22. From the section 22 the tray 24 is being conveyed further on to the delivery platform 12. In the second position, the section 22 establishes a conveying connection between the delivery platform 12 and the section 18.

The conveying movement of the sections 22 and 18 may be activated in an analogous way as described above in conjunction with the conveyor sections 13 and 14.

Figure 7:
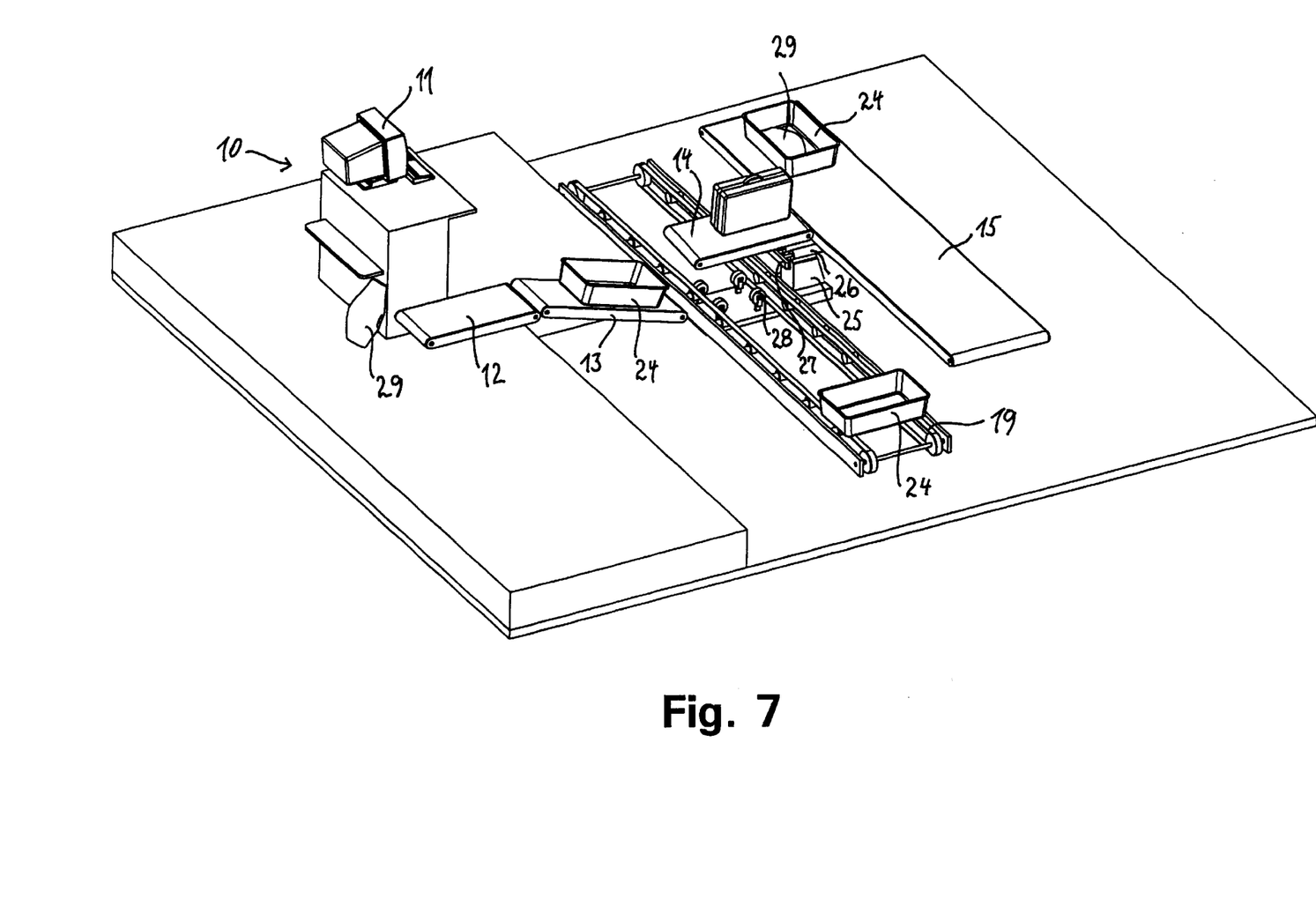
FIG. 7 shows a fourth embodiment of a conveyor system according the present invention in a first operating mode.
Figure 8:
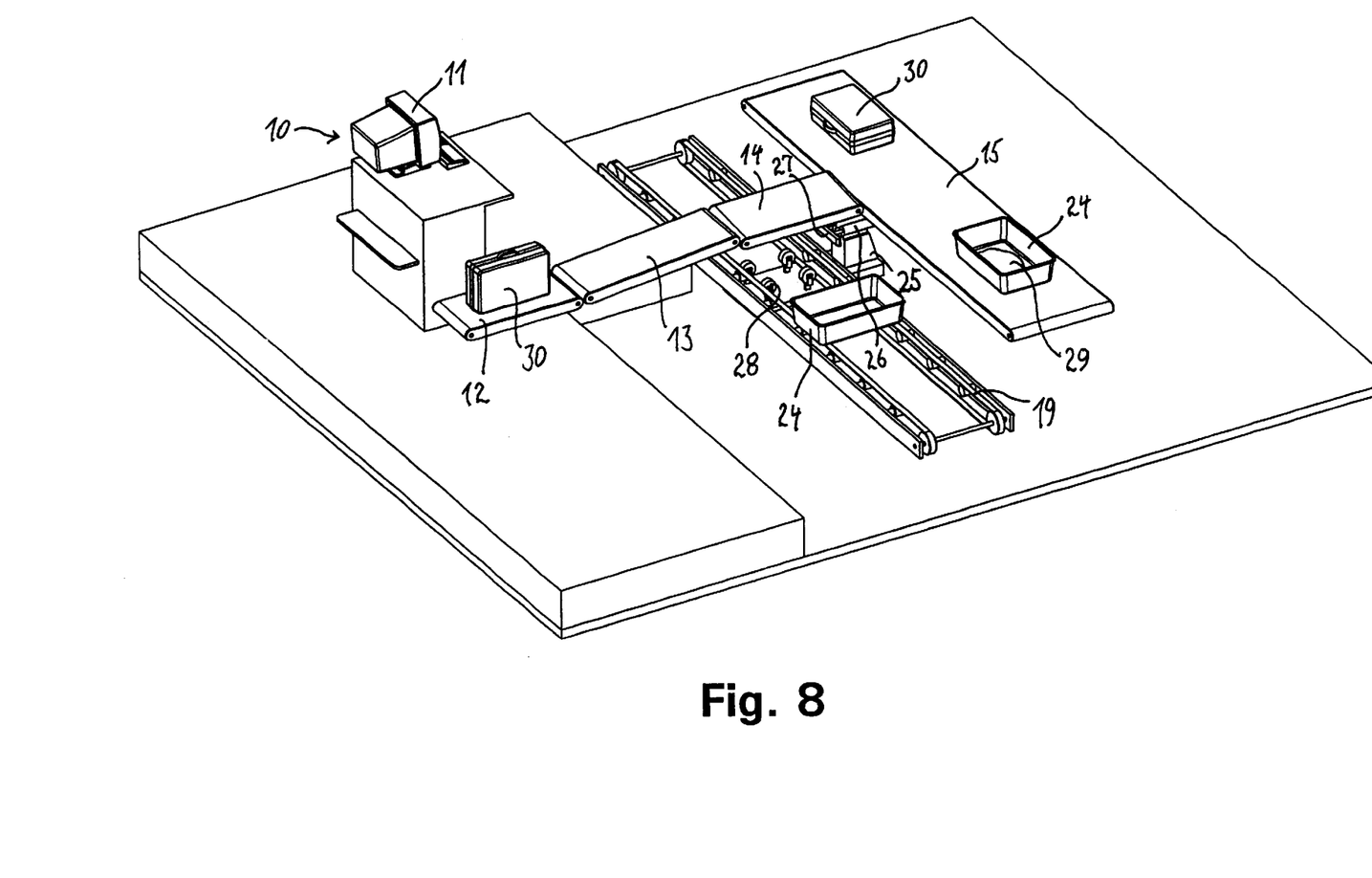
FIG. 8 shows the conveyor system of FIG. 7 in a second operating mode.

FIGS. 7 and 8 show a further embodiment of a conveyor system according to the invention wherein the movable conveyor section 13 is directly connected to the main tray conveyor 19 in the first operating position as illustrated in FIG. 7. In the embodiment of FIGS. 7 and 8, the successful delivery of a tray 24 at the delivery platform 12 requires that a tray is present at a or near a position in which the transferring means 25 may transfer a tray 24 onto the movable conveyor section 13 when a tray 24 is needed at the delivery platform 12. For many applications of the conveyor system, a tray 24 will normally be present at such a location when required.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A conveyor system for conveying luggage of different types including luggage which needs to be supported by separate supporting members when being transported by the conveyor system, the conveyor system comprising:
   a delivery platform for receiving an article to be transported;
   storing means for storing a supply of supporting members; and
   conveyor means for selectively moving a supporting member from the storing means to the delivery platform when actuated by an operator or an operating means, the conveyor means comprising a first conveyor section being movable between a first position establishing a conveyor connection between the storing means and the delivery platform, and a second position in which said conveyor connection is disrupted.

2. A conveyor system according to claim 1, wherein the storing means and the delivery platform are positioned at different levels.

3. A conveyor system according to claim 2, further comprising a conveyor arrangement for transporting articles placed on the delivery platform to a predetermined destination.

4. A conveyor system according to claim 1, further comprising means for pivotally moving the first conveyor section between said first and second positions about a pivot axis positioned at one end of the first conveyor section.

5. A conveyor system according to claim 4, wherein the first conveyor section forms part of the conveyor arrangement in the second position of the first conveyor section.

6. A conveyor system according to claim 5, wherein the conveyor arrangement further comprises at least one second conveyor section interconnecting the delivery platform and the first conveyor section in the second position.

7. A conveyor system according to claim 1, wherein the conveyor arrangement comprises:
a main article conveyor for conveying articles to the predetermined destination; and
one or more connecting conveyor sections interconnecting the first conveyor section and the main conveyor when the first conveyor section is in the second position.

8. A conveyor system according to claim 5, further comprising means for reversing the direction of movement of the first conveyor section when it is in its first position so as to move a supporting member from the storing means to the delivery platform.

9. A conveyor system according to claim 4, wherein the conveyor arrangement further comprises a third conveyor section positioned above the first conveyor section, the first and third conveyor sections being pivotally movable between a first position in which the storing means is interconnected with the delivery platform by the first conveyor section, while the conveyor arrangement is disrupted by the third conveyor section, and a second position in which the connection between the storing means and the delivery platform is disrupted by the first conveyor section, while the third conveyor section establishes a conveyor connection between the delivery platform and the conveyor arrangement.

10. A conveyor system according to claim 1, wherein the storing means comprises a supporting member conveyor and means for transferring a supporting member at a predetermined position on said conveyor to the first conveyor section.

11. A conveyor system according to claim 10, wherein said means for transferring a supporting member comprises one or more transfer conveyor sections interconnecting the supporting member conveyor and the first conveyor section when the first conveyor section is in the first position.

12. A conveyor system according to claim 11, further comprising a return conveyor for returning supporting members from said predetermined destination to the supporting member conveyor.

13. A conveyor system according to claim 12, wherein the transferring means comprises means for moving a supporting member located at said predetermined position on the supporting member conveyor in a direction transversely to the supporting member conveyor so as to allow a succeeding support member to be moved into said predetermine position along the supporting member conveyor.

14. A conveyor system according to claim 1, wherein the conveyor means comprises one or more belt conveyor sections.

15. A conveyor system according to claim 8 further comprising actuator means for activating the pivoting movement of the first conveyor section.

16. A conveyor system according to claim 15, further comprising a control unit electronically interconnected to the actuator means and to operating means operable by the operator.

17. A conveyor system according to claim 16, wherein the control unit is an integrated part of a data system.

18. A conveyor plant comprising one or more conveyor systems for conveying luggage of different types including luggage which needs to be supported by separate supporting members when being transported by the conveyor system, said system comprising:
a delivery platform for receiving an article to be transported;
storing means for storing a supply of supporting members;
conveyor means for selectively moving a supporting member from the storage means to the delivery platform when actuated by an operator or an operating means, the conveyor means comprising a first conveyor section being movable between a first position establishing a conveyor connection between the storing means and the delivery platform, and a second position in which said conveyor connection is disrupted; and
a main article conveyor for conveying articles to a predetermined destination.

19. A conveyor plant according to claim 18, comprising at least two conveyor systems, wherein at least the main article conveyors of at least two neighboring conveyor systems are interconnected so that luggage may be conveyed from one conveyor system to another.

20. A method of operating a conveyor system for transporting luggage, the conveyor system comprising a delivery platform for receiving an article to be transported, storing means for storing a supply of supporting members for supporting articles to be transported, and conveyor means for moving a supporting member from the storing means to the delivery platform, the conveyor means comprising a first conveyor section being movable between a first position establishing a conveyor connection between the storing means and the delivery platform, and a second position in which said conveyor connection is disrupted, the method comprising the steps of:
for each article to be conveyed by the conveyor system:
determining whether a supporting member is needed for conveying the article,
for articles needing a supporting member, moving said first conveyor section so as to establish said connection;
moving a supporting member from the storing means to the delivery platform and placing the article on the supporting member;
for articles not needing a supporting member, placing the article on the delivery platform; and
conveying the articles from the delivery platform to a destination location in the conveyor system.

21. A method according to claim 20, wherein the supporting members are moved between different levels when being moved from the storing means to the delivery platform.

22. A method according to claim 20, wherein the first conveyor section is pivotally moved between said first and second positions about a pivot axis positioned at one end of the first conveyor section.

23. A method according to claim 20, wherein the storing means comprise a supporting member conveyor, the method further comprising the step of transferring a supporting member from the supporting member conveyor to the first conveyor section.

24. A method according to claim 20, wherein the movement of the supporting member is actuated by an operator.

25. A method according to claim 20, wherein the movement of the supporting member is actuated by an operating means.

\* \* \* \* \*